United States Patent
Nadarajah et al.

(10) Patent No.: US 11,301,566 B2
(45) Date of Patent: Apr. 12, 2022

(54) FIRMWARE ANTI-ROLLBACK

(71) Applicant: ATI Technologies ULC, Markham (CA)

(72) Inventors: Kathirkamanathan Nadarajah, Richmond Hill (CA); Benedict Chien, Aurora (CA)

(73) Assignee: ATI Technologies ULC, Markham (CA)

( * ) Notice: Subject to any disclaimer, the term of this patent is extended or adjusted under 35 U.S.C. 154(b) by 303 days.

(21) Appl. No.: 16/502,733

(22) Filed: Jul. 3, 2019

(65) Prior Publication Data
US 2021/0004466 A1 Jan. 7, 2021

(51) Int. Cl.
| G06F 15/177 | (2006.01) |
| G06F 9/00 | (2006.01) |
| G06F 21/57 | (2013.01) |
| G06F 9/4401 | (2018.01) |
| G06F 9/445 | (2018.01) |
| G06F 21/71 | (2013.01) |
| G06F 8/65 | (2018.01) |

(52) U.S. Cl.
CPC ............ G06F 21/572 (2013.01); G06F 8/65 (2013.01); G06F 9/4403 (2013.01); G06F 9/445 (2013.01); G06F 21/71 (2013.01); *G06F 2221/033* (2013.01)

(58) Field of Classification Search
CPC ...... G06F 21/572; G06F 9/4403; G06F 9/445; G06F 21/71; G06F 8/65; G06F 2221/033; G06F 9/4401; G06F 8/654
See application file for complete search history.

(56) References Cited

U.S. PATENT DOCUMENTS

| 8,745,612 B1 * | 6/2014 | Semenzato ............... G06F 8/65 717/170 |
| 2003/0236970 A1 | 12/2003 | Palmer et al. |
| 2008/0244556 A1 * | 10/2008 | Plante ................... G06F 21/629 717/170 |
| 2014/0068585 A1 | 3/2014 | Young et al. |
| 2014/0088655 A1 | 3/2014 | Stone et al. |
| 2014/0130151 A1 | 5/2014 | Krishnamurthy et al. |
| 2014/0250290 A1 | 9/2014 | Stahl et al. |

(Continued)

OTHER PUBLICATIONS

International Search Report and Written Opinion for International Application No. PCT/IB2020/000490, dated Oct. 15, 2020, 9 pages.

*Primary Examiner* — Xuxing Chen
(74) *Attorney, Agent, or Firm* — Polansky & Associates, P.L.L.C.; Paul J. Polansky; Nathan H. Calvert

(57) ABSTRACT

A platform security processor is booted and reads a set of write-once memory bits to obtain a minimum security patch level (SPL). The security processor then verifies that a table SPL for a firmware security table is greater than or equal to the minimum SPL. The firmware security table includes a plurality of firmware identifiers for firmware code modules, and a plurality of check SPL values each associated with respective one of the firmware identifiers. The security processor verifies SPL values in a plurality of firmware code modules by, for each firmware code module, accessing the module to obtain its firmware SPL value and check if the respective firmware SPL value is equal to or greater than a respective check SPL value in the firmware security table.

25 Claims, 5 Drawing Sheets

(56) References Cited

U.S. PATENT DOCUMENTS

| | | |
|---|---|---|
| 2015/0113258 A1 | 4/2015 | Grieco et al. |
| 2015/0143163 A1 | 5/2015 | Dasari et al. |
| 2017/0010881 A1 | 1/2017 | Kawazu |
| 2017/0039053 A1 | 2/2017 | Sluvanathan et al. |

* cited by examiner

FIRMWARE ANTI-ROLLBACK

BACKGROUND

When firmware is released for a new computing product, vulnerabilities may be found after the launch of the product. When found, vulnerabilities may be mitigated with hardware, firmware, and/or software updates where possible. In such cases, if the vulnerabilities are critical and addressable by software or firmware, it is desirable to implement a revocation mechanism such that versions of software or firmware deemed vulnerable are not allowed to execute on a system. In such cases, an in-field upgrade of the software or firmware must be performed to maintain functionality.

Firmware anti-rollback features have been developed to manage the security of firmware upgrades. Some anti-rollback features use write-once memory bits, such as one time programmable fuses, to track an authorized version number of certain firmware. However, there are typically a limited number of one time programmable fuses available for these solutions. Further, these solutions suffer from bloating of the number of write-once memory bits required due to the number of firmware updates that occur in complex computing platforms.

Figure 1:
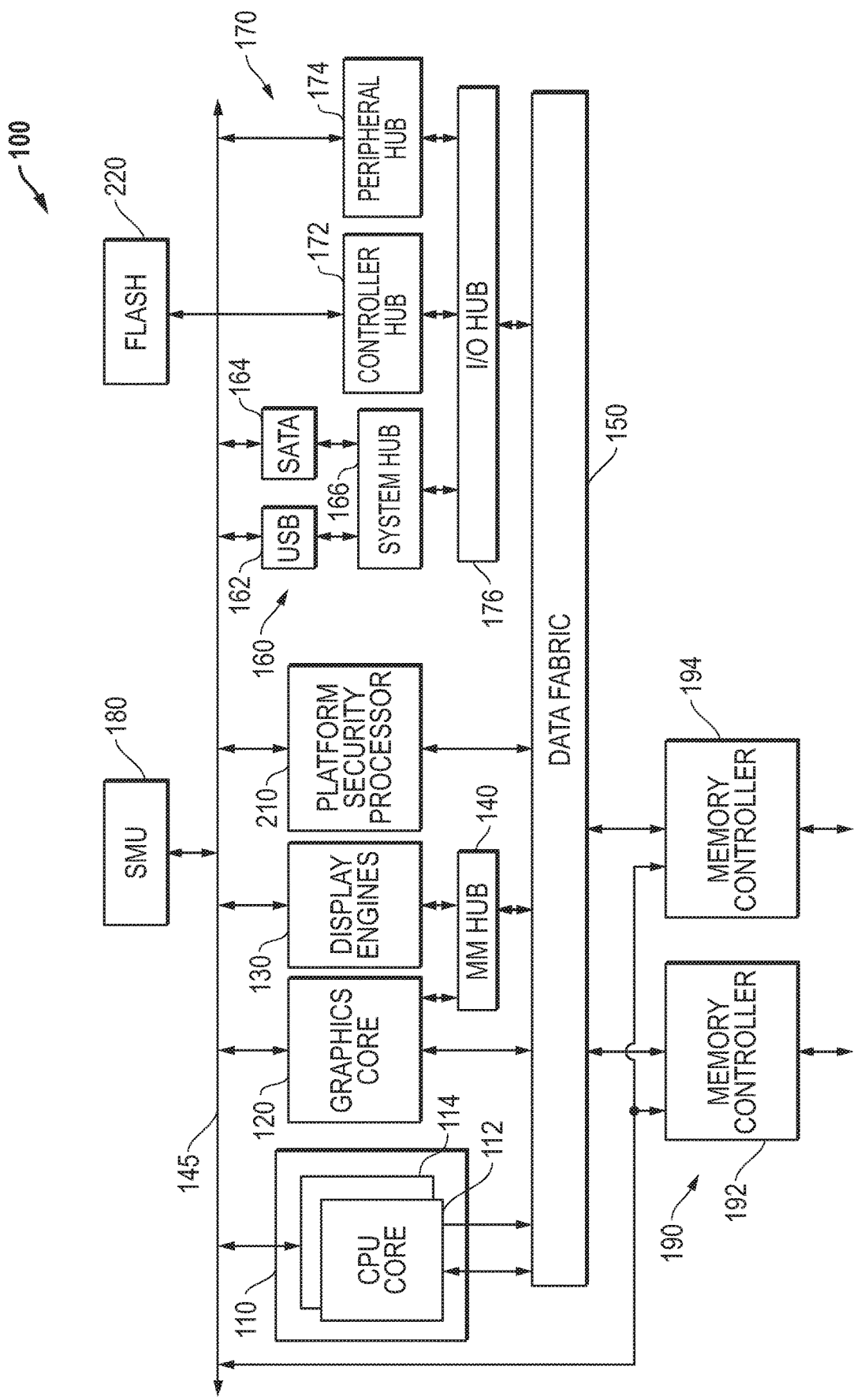
FIG. 1 illustrates in block diagram form an accelerated processing unit (APU) including anti-rollback security features according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A method verifies firmware for a computing platform. The method includes booting a security processor and, at the security processor, reading a set of write-once memory bits to obtain a minimum security patch level (SPL). The method verifies that a table SPL for a firmware security table is greater than or equal to the minimum SPL, the firmware security table including a plurality of firmware identifiers for firmware code modules, and a plurality of check SPL values each associated with respective one of the firmware identifiers. The method also verifies a plurality of firmware code modules by, for each firmware code module, (a) accessing each respective firmware module and obtaining a respective firmware SPL value, (b) accessing the firmware security table to obtain a respective one of the check SPL values, and (c) checking if the respective firmware SPL value is equal to or greater than the respective check SPL value.

A data processing platform includes a non-volatile memory and a system on chip coupled to the non-volatile memory. The system on chip includes a processor with one or more processing cores, and a security processor including a microcontroller core, a set of write-once memory bits coupled to the microcontroller core, a random-access memory (RAM) coupled to the microcontroller core, and a secure boot read-only memory (ROM) coupled to the microcontroller core. The security processor operates to boot the security processor and read the set of write-once memory bits to obtain a minimum security patch level (SPL). The security processor verifies that a table SPL for a firmware security table is greater than or equal to the minimum SPL, the firmware security table including a plurality of firmware identifiers for firmware code modules, and a plurality of check SPL values each associated with respective one of the firmware identifiers. The security processor also verifies a plurality of firmware code modules by, for each firmware code module, (a) accessing each respective firmware module and obtaining a respective firmware SPL value, (b) accessing the firmware security table to obtain a respective one of the check SPL values, and (c) checking if the respective firmware SPL value is equal to or greater than the respective check SPL value.

A security processor includes a microcontroller core, a set of write-once memory bits coupled to the microcontroller core, a RAM coupled to the microcontroller core, and a secure boot ROM coupled to the microcontroller core. The security processor operates to boot the security processor and read the set of write-once memory bits to obtain a minimum SPL. The security processor verifies that a table SPL for a firmware security table is greater than or equal to the minimum SPL, the firmware security table including a plurality of firmware identifiers for firmware code modules, and a plurality of check SPL values each associated with respective one of the firmware identifiers. The security processor also verifies a plurality of firmware code modules by, for each firmware code module, (a) accessing each respective firmware module and obtaining a respective firmware SPL value, (b) accessing the firmware security table to obtain a respective one of the check SPL values, and (c) checking if the respective firmware SPL value is equal to or greater than the respective check SPL value.

One or more tangible, non-transitory computer readable media hold a program product including instructions executable by a security processor. The instructions are executable for booting the security processor and, at the security processor, reading a set of write-once memory bits to obtain a minimum security patch level (SPL). The instructions are further executable for verifying that a table SPL for a firmware security table is greater than or equal to the minimum SPL, the firmware security table including a plurality of firmware identifiers for firmware code modules, and a plurality of check SPL values each associated with respective one of the firmware identifiers. The instructions are further executable for verifying a plurality of firmware code modules by, for each firmware code module, (a) accessing each respective firmware module and obtaining a respective firmware SPL value, (b) accessing the firmware security table to obtain a respective one of the check SPL values, and (c) checking if the respective firmware SPL value is equal to or greater than the respective check SPL value.

FIG. 1 illustrates in block diagram form an accelerated processing unit (APU) 100 including anti-rollback security features according to some embodiments. APU 100 is implemented as a System-on-Chip (SoC) which may be part of a variety of host data processing platforms. While an APU is shown in this embodiment, other data processing platforms such as a central processing unit (CPU) or a graphics processing unit (GPU) may be used. APU 100 includes generally a CPU core complex 110, a graphics core 120, a set of display engines 130, a memory management hub 140, a data fabric 150, a set of peripheral controllers 160, a set of peripheral bus controllers 170, a system management unit (SMU) 180, a platform security processor (PSP) 210, a flash memory 220, and a set of memory controllers 190.

CPU core complex 110 includes a CPU core 112 and a CPU core 114. In this example, CPU core complex 110 includes two CPU cores, but in other embodiments CPU core complex 110 can include an arbitrary number of CPU cores. Each of CPU cores 112 and 114 is bidirectionally connected to a system management network (SMN) 145, which forms a control fabric, and to data fabric 150, and is capable of providing memory access requests to data fabric 150. Each of CPU cores 112 and 114 may be unitary cores, or may further be a core complex with two or more unitary cores sharing certain resources such as caches.

Graphics core 120 is a high performance graphics processing unit (GPU) capable of performing graphics operations such as vertex processing, fragment processing, shading, texture blending, and the like in a highly integrated and parallel fashion. Graphics core 120 is bidirectionally connected to the SMN 145 and to data fabric 150, and is capable of providing memory access requests to data fabric 150. In this regard, APU 100 may either support a unified memory architecture in which CPU core complex 110 and graphics core 120 share the same memory space, or a memory architecture in which CPU core complex 110 and graphics core 120 share a portion of the memory space, while graphics core 120 also uses a private graphics memory not accessible by CPU core complex 110.

Display engines 130 render and rasterize objects generated by graphics core 120 for display on a monitor. Graphics core 120 and display engines 130 are bidirectionally connected to a common memory management hub 140 for uniform translation into appropriate addresses in memory, and memory management hub 140 is bidirectionally connected to data fabric 150 for generating such memory accesses and receiving read data returned from the memory system.

Data fabric 150 includes a crossbar switch for routing memory access requests and memory responses between any memory accessing agent and memory controllers 190. It also includes a system memory map, defined by basic input/ouput system (BIOS), for determining destinations of memory accesses based on the system configuration, as well as buffers for each virtual connection.

Peripheral controllers 160 include a USB controller 162 and a serial advanced technology attachment (SATA) interface controller 164, each of which is bidirectionally connected to a system hub 166 and to SMN 145. These two controllers are merely exemplary of peripheral controllers that may be used in APU 100.

Peripheral bus controllers 170 include a system controller hub 172 and a peripheral controller hub 174, each of which is bidirectionally connected to an input/output (I/O) hub 176 and to SMN 145. System controller hub 172 connects to Flash memory 220 over a suitable communications link. I/O hub 176 is also bidirectionally connected to system hub 166 and to data fabric 150. Thus, for example, a CPU core can program registers in USB controller 162, SATA interface controller 164, system controller hub 172, or peripheral controller hub 174 through accesses that data fabric 150 routes through I/O hub 176.

SMU 180 is a local controller that controls the operation of the resources on APU 100 and synchronizes communication among them. SMU 180 manages power-up sequencing of the various processors on APU 100 and controls multiple off-chip devices via reset, enable and other signals. SMU 180 also manages power for the various processors and other functional blocks.

Platform security processor (PSP) 210 is a local security controller that controls the firmware booting process aboard the APU 100. PSP 210 also performs certain software validation and Firmware Anti-Rollback (FAR) features, as will be further described below.

While an SoC implementation is shown, this is not limiting, and other computing platforms may also benefit from the FAR techniques set forth herein.

Figure 2:
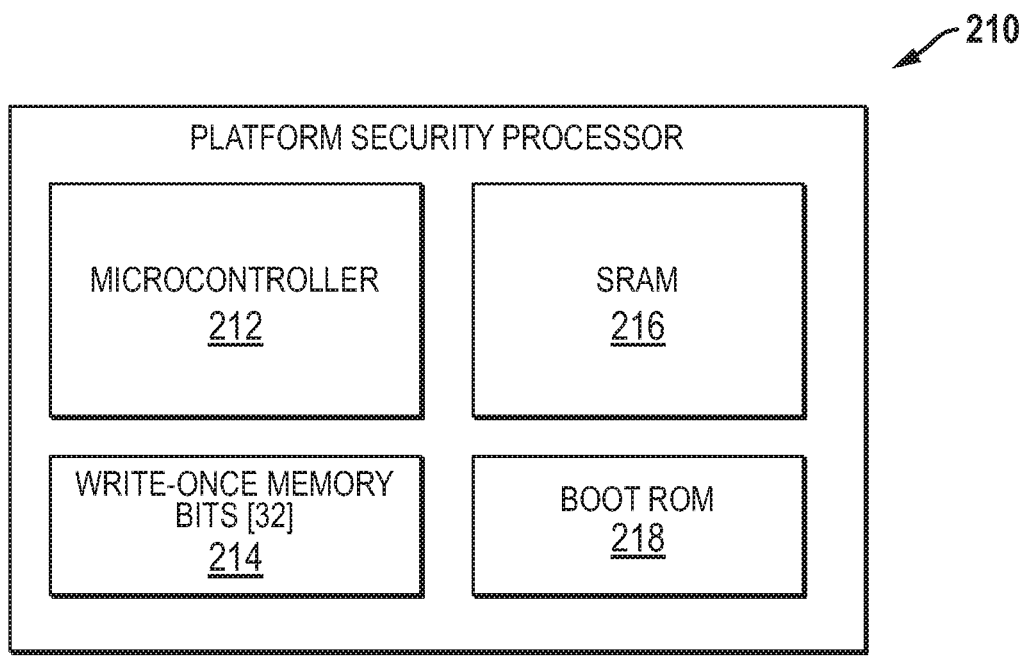
FIG. 2 illustrates in block diagram form a more detailed view of a PSP according to some embodiments.

FIG. 2 illustrates in block diagram form a more detailed view of a PSP 210 according to some embodiments. PSP 210 includes a microcontroller core 212, a RAM such as static RAM (SRAM) 216 connected to the microcontroller core 212, a boot ROM 218 connected to the microcontroller core 212, and a plurality of write-once memory bits 214 connected to the microcontroller core 212.

Generally, PSP 210 operates as a security processor for APU 100. PSP 210 may include additional functional blocks (not shown for clarity), such as cryptographic logic used to perform secure validations, and interface logic for communicating with SMN 145 and data fabric 150. In operation, PSP 210 performs secure booting of APU 100, including implementing the FAR features herein, and fulfills other security related functions requested by CPU core complex 110 and the other peripheral controllers of APU 100.

Boot ROM 218 is preferably a secure boot ROM with anti-tamper features, and holds executable code and configuration data for initializing PSP 210.

Write-once memory bits 214 preferably include a plurality of write-once bits, such as a 32-bit array, configured as an array for storing a minimum security patch level (SPL) as described below. Write-once memory bits 214 may also include single bits or other arrays of bits used for tracking other values. The bits are preferably implemented as fuses located on-chip with PSP 210, but any suitable write-once technology may be used. While this particular security processor implementation is given as an example, other types of security processors may be employed to implement the features described herein when combined with suitable secure memory and write-once memory bits.

Figure 3:
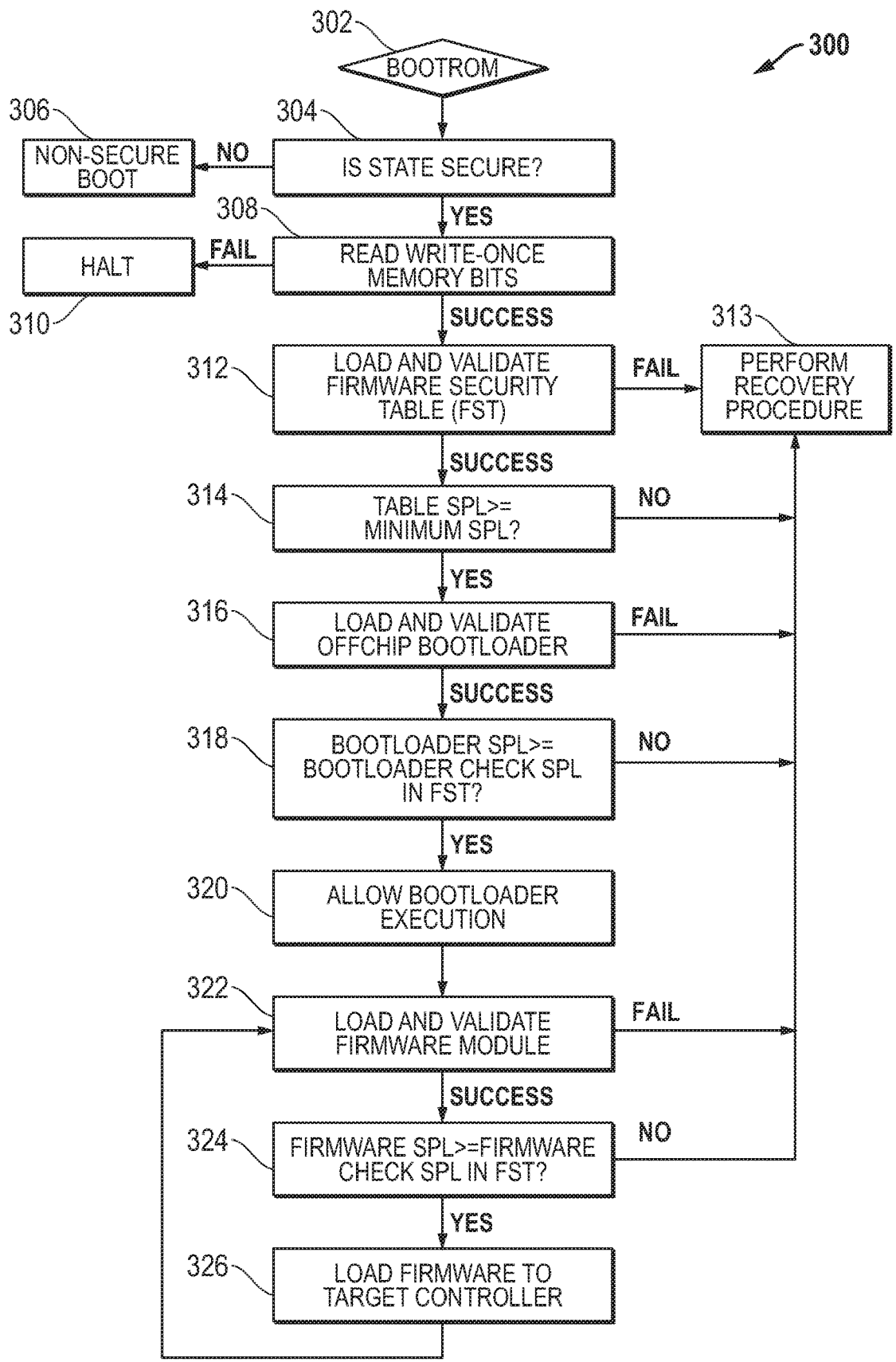
FIG. 3 illustrates in flow diagram form a process for validating and loading firmware according to some embodiments.

FIG. 3 illustrates in flow diagram form a process 300 for validating and loading firmware according to some embodiments. Process 300 generally runs on a security processor such as PSP 210 and implements an FAR feature which defines a write-once security patch level (SPL) that serves as a hardware root of trust. The minimum SPL is a minimum version number that is updated when critical updates are made to the firmware to prevent rollback of the firmware to earlier versions. Process 300 begins at block 302, where it boots the security processor from a boot ROM, such as a secure ROM integrated with the security processor. In this embodiment, the boot ROM code from which the security processor is booted includes instructions controlling process 300 until block 320, where bootloader code is allowed to execute and control process 300.

At block 304, process 300 checks whether a SECURE state is enabled. This check may include checking one or more write-once bits, typically written or burned during factory configuration, to determine that a SECURE state is desired and that FAR feature is enabled. If a SECURE state is not enabled, process 300 goes to block 306 where it performs a non-secure boot of the host platform, not using the FAR feature.

If the SECURE state is enabled at block 304, process 300 goes to block 308 where it reads a set of write-once memory bits to obtain the minimum security patch level (SPL). If the read fails, or returns an invalid value, process 300 goes to block 310 where it halts the boot process. Such a halt may include storing a record of the failure in non-volatile memory recording the reason for the halt.

After a successful read of the write-once memory bits at block 308, a firmware security table (FST) is loaded and validated at block 312. Typically, the FST is loaded from non-volatile memory, which may be on board the host SoC or in a separate chip such as Flash memory 220 of FIG. 1, into SRAM 216 onboard the security processor. The FST includes a plurality of firmware identifiers for firmware code modules, and a plurality of check SPL values each associated with respective one of the firmware identifiers, as further described with respect to FIGS. 5-6. The FST validation includes a cryptographic check of the FST against a stored signature or other suitable value to confirm the FST has not been altered. If the validation fails at block 312, a recovery procedure at block 313 is entered. This procedure may halt the boot or attempt to recover with a prior FST version if one is available that would meet the minimum SPL check. A non-secure boot to a safe mode or other suitable recovery procedure may also be used.

If the FST is successfully loaded and validated at block 312, block 314 reads a table SPL value stored with the FST, and verifies that the table SPL is greater than or equal to the minimum SPL obtained at block 308. If the table SPL does not pass this check, process 300 goes to the recovery procedure at block 313.

If the table SPL passes the check at block 314, a bootloader is loaded and validated at block 316. The bootloader is preferably loaded from off-chip non-volatile memory such as Flash memory 220 (FIG. 1). The validation includes a suitable known cryptographic verification such comparing a signature of the bootloader executable code with a stored value, or checking a signature using a public key. If the bootloader fails to successfully load and validate, process 300 goes to the recovery procedure at block 313.

If the bootloader is successfully loaded and validated at block 316, a bootloader SPL is compared to a bootloader check SPL from the FST at block 318. This comparison includes checking if the bootloader SPL value is greater than or equal to the bootloader check SPL value stored in the FST. The bootloader FST is preferably retrieved along with the bootloader, from a firmware header for the bootloader such as that described with respect to FIG. 6. If the check fails at block 318, process 300 goes to the recovery procedure at block 313.

If the check passes at block 318, the bootloader is loaded to the security processor and executed starting at block 320. At this point the bootloader controls process 300 to verify the remaining firmware modules needed to boot the host platform. Process 300 goes to block 322 where the bootloader begins to iteratively load, validate, and verify firmware modules for various controllers on the host system until all desired firmware modules are loaded. The loading and validating proceeds similarly to those described above, with a signature or other cryptographic check calculated for the respective firmware module and comparing it to a stored value. If a firmware module fails to successfully load and validate, process 300 goes to the recovery procedure at block 313.

If the firmware module passes validation at block 322, block 324 proceeds with verification of firmware modules to prevent malicious rollback activity. The verification includes, for each firmware code module, (a) accessing each respective firmware module and obtaining a respective firmware SPL value, (b) accessing the FST to obtain a respective one of the check SPL values, and (c) checking if the respective firmware SPL value is equal to or greater than the respective check SPL value. Preferably the firmware SPL values are stored with the firmware module in a firmware header.

If the verification passes at block 324, the firmware is loaded to the target controller on the host platform at block 326. Block 326 may include commands from the security processor to the target controller to load and execute the firmware. If the verification fails at block 324, process 300 goes to the recovery procedure at block 313.

After each firmware module is loaded at block 326, process 300 goes to block 322 to load and validate the next firmware module until all modules are loaded.

While a single FST is used in this embodiment, other embodiments may use multiple FSTs, each having an SPL value checked against a write-once memory SPL value similarly to the FST described here, or against an entry in the FST. For example, the bootloader may provide loading and validation of firmware modules for a secure operating system. An auxiliary FST may be used for this, which is verified by the bootloader running on the security processor, and then made available to a secure operating system for verifying additional firmware modules under control of another processor such as CPU core complex 110 (FIG. 1). In such a case, the security processor may fulfill requests from a secure operating system to load or load and validate a firmware module.

While process 300 includes verifying firmware modules, other types of modules may also be verified against the FST to provide anti-rollback capability. For example, secure operating system modules or libraries may be verified and loaded in a similar manner to the firmware modules described above.

While process 300, in this embodiment, begins under control of executable code from a secure boot ROM and passes control to a bootloader, other versions may operate the security processor differently. In some embodiments, a secure boot ROM may perform all of the firmware module verifications without loading a bootloader. In other versions, such as the process of FIG. 4, a bootloader may control the process of reading the write-once memory bits and verifying the FST.

As can be understood, the use herein of an FST to verify firmware updates has the advantage of requiring fewer write-once memory bits than techniques which tracking firmware versions directly in write-once memory. The verification of the FST against a minimum SPL provides a similar level of security as direct use of write-once memory, but uses less circuit area.

Figure 4:
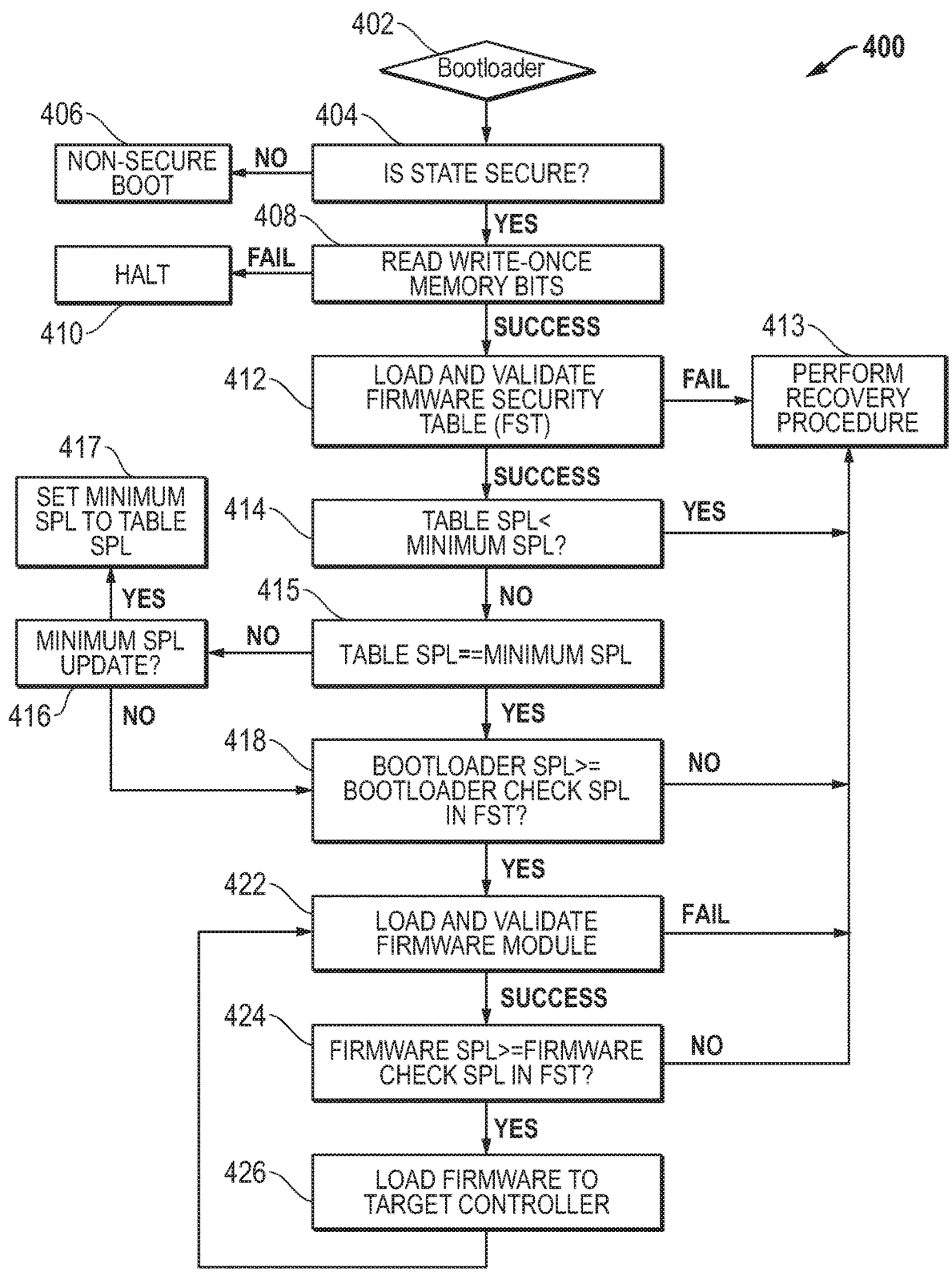
FIG. 4 illustrates in flow diagram form another process for validating and loading firmware and software according to some embodiments.

FIG. 4 illustrates in flow diagram form another process 400 for validating and loading firmware and software according to some embodiments. Process 400 has many similar operations to process 300, but is performed by the security processor executing a bootloader rather than having boot ROM code control the initial verification of the table SPL. This technique provides more configurability and upgradeability to the security processor while still maintaining the anti-rollback functionality described above.

Process 400 begins at block 402 where the security processor executes a bootloader stored in off-chip non-volatile memory. Blocks 404 and 406 proceed similarly to blocks 304 and 306 except they are under control of the bootloader instead of boot ROM code. At block 404, process 400 checks whether a SECURE state is enabled. If a SECURE state is not enabled, process 300 goes to block 306 where it performs a non-secure boot of the host platform, not using the FAR feature.

If the SECURE state is enabled at block 404, process 400 goes to block 408 where, under control of the bootloader, the security processor reads a set of write-once memory bits to obtain a minimum security patch level (SPL). If the read fails, or returns an invalid value, process 400 goes to block 410 where it halts the boot process.

After a successful read of the write-once memory bits at block 408, a firmware security table (FST) is loaded and validated at block 412. The FST is similar to that described with respect FIG. 3. If the validation fails at block 412, a recovery procedure at block 413 is entered. This procedure may halt the boot or attempt to recover with a prior FST version if one is available that still meets the minimum SPL check at block 414. A non-secure boot to a safe mode or other suitable recovery procedure may also be used.

If the FST is successfully loaded and validated at block 412, at block 414 the security processor under control of the bootloader reads a table SPL value stored with the FST, and performs a sequence in which the table SPL is checked to see if an update is needed. Block 414 checks if the table SPL is less than the minimum SPL obtained at block 408. If so, process 400 goes to the recovery procedure at block 413.

If the table SPL is not less than the minimum SPL at block 414, it still may require an update to the minimum SPL. Block 415 checks if the table SPL is equal to the minimum SPL. If not, process 400 goes to block 416 where it checks if the minimum SPL needs to be updated in the write-once memory bits. This check detects that a firmware update has been made that requires an update to the minimum SPL. The check may be implemented using one or more settings that can be configured by secure update code when an update is made. A write-once memory bit such as a fuse may serve as an SPL update flag and be checked by the secure processor to see if the bit has been previously set to indicate that an SPL update is required. Such a bit is typically one of many provided on board the security processor allowing for multiple updates. If set, bootloader must update the minimum SPL value. Another check may be made to detect an update, in addition to or instead of a write-once bit. For example, a BIOS flag may be set indicating that an SPL update flag needs to be set in a write-once memory bit. Such a scenario should only be used in an architecture where the BIOS is trusted to be secure. If a BIOS flag requires it, process 400 sets the SPL update flag prior to performing any other action. If a minimum SPL update is not required at block 416, process 400 goes to block 418.

If an update requiring a minimum SPL update is detected at block 416, block 417 sets the minimum SPL to the table SPL by writing a new value to the write-once memory bits. An update to the minimum SPL may require a reboot or may proceed to block 418.

Block 418 verifies the bootloader by checking if the bootloader SPL is greater than or equal to a bootloader check SPL in the FST. If the bootloader SPL does not pass this check, process 400 goes to the recovery procedure at block 413.

If the bootloader SPL passes the check at block 418, process 400 goes to block 422 where it begins to load, validate, and verify firmware modules. At block 422, the bootloader begins to iteratively load, validate, and verify firmware modules for various controllers on the host system until all desired firmware modules are loaded. The loading and validating proceeds similarly to those described above, with a signature or other cryptographic check calculated for the respective firmware module and comparing it to a stored value. If a firmware module fails to successfully load and validate, process 400 goes to the recovery procedure at block 413.

If the firmware module passes validation at block 422, block 424 proceeds with verification of firmware modules to prevent malicious rollback activity. The verification includes, for each firmware code module, (a) accessing each respective firmware module and obtaining a respective firmware SPL value, (b) accessing the FST to obtain a respective one of the check SPL values, and (c) checking if the respective firmware SPL value is equal to or greater than the respective check SPL value. Preferably the firmware SPL values are stored with the firmware module in a firmware header.

If the verification passes at block 424, the firmware is loaded to the target controller on the host platform at block 426. Block 426 may include commands from the security processor to the target controller to load and execute the firmware. If the verification fails at block 424, process 400 goes to the recovery procedure at block 413. After each firmware module is loaded at block 426, process 400 goes to block 422 to load and validate the next firmware module until all modules are loaded.

It is noted that the procedure to update the minimum SPL value at blocks 415, 416, and 417 may also be integrated into process 300 of FIG. 3, performed under control of the boot ROM or the bootloader.

Figures 5, 6:
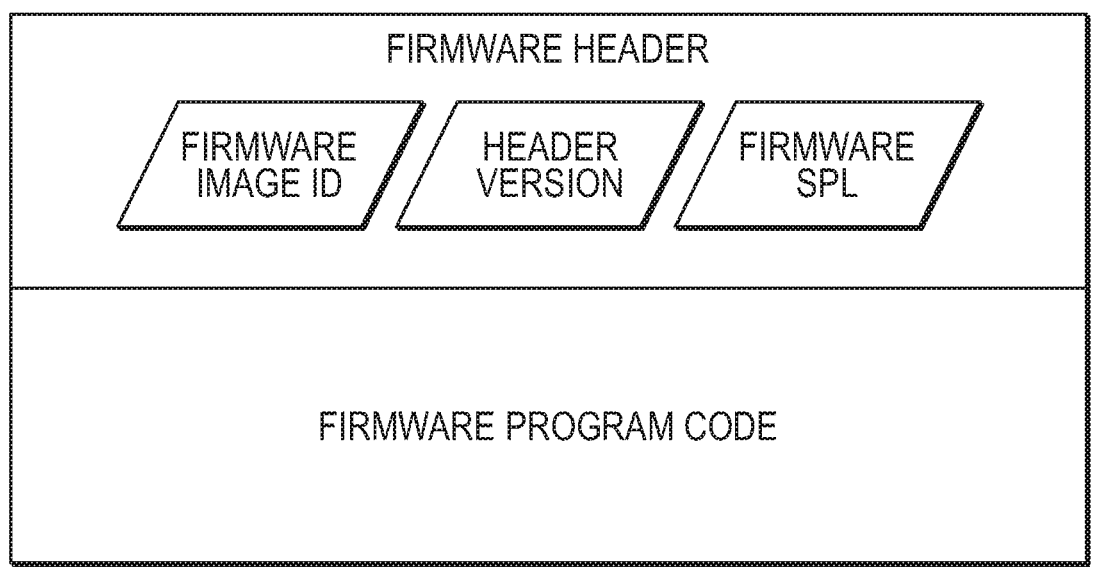
FIG. 5 illustrates in table form a firmware security table (FST) according to some embodiments.
FIG. 6 illustrates a diagram of a firmware module according to some embodiments.

FIG. 5 illustrates in table form a firmware security table (FST) 500 according to some embodiments. As described above, FST 500 is preferably stored in nonvolatile memory such as Flash memory, then loaded by PSP 210 into SRAM 216 (FIG. 2) where it is used in verifying firmware. FST 500 includes a set of firmware identifiers, as shown by the Firmware Image ID column for firmware code modules. FST 500 also includes a plurality of check SPL values each associated with respective one of the firmware identifiers.

FIG. 6 illustrates a diagram of a firmware module 600 according to some embodiments. Firmware module 600 includes executable firmware program code and a firmware header for use with the FAR techniques herein. The firmware header is present as a file header or otherwise associated with the firmware executable code stored in non-volatile memory. The firmware header includes a Firmware Image ID which is matched to the associated ID in the FST. A Header Version identifies the version of the header, which may be used to interpret the header format. A firmware SPL is included which is employed in the verification described above to check against the associated SPL value stored in the FST. Other data items such as a signature may also be included in the firmware header. Furthermore, a similar structure may be used with other firmware or software to be verified by the security processor, such as secure operating system (OS) executable code or other software code.

The APU 100 of FIG. 1, or any portions thereof, or other implementations of a data processing platform that employ the techniques herein, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, multiple FSTs may be employed, each having a minimum SPL stored in write-once memory bits. Other types of software may be verified using the FSTs. The particular location of the write-once memory bits, boot ROM, and non-volatile memory may change within security constraints. Further, the security processor may perform verifications of firmware or software modules against SPL values stored in an FST as a service for other processors or controllers in the host system. Various encryption schemes may also be used on the data values stored in the FST without altering the secure FAR functionality described herein.

Accordingly, it is intended by the appended claims to cover all modifications of the disclosed embodiments that fall within the scope of the disclosure.

What is claimed is:

1. A method of verifying firmware for a computing platform, comprising:
    booting a security processor;
    at the security processor, reading a set of write-once memory bits to obtain a minimum security patch level (SPL);
    at the security processor, verifying that a table SPL for a firmware security table is greater than or equal to the minimum SPL, the firmware security table including a plurality of firmware identifiers for firmware code modules, and a plurality of check SPL values each associated with respective one of the firmware identifiers;
    verifying a plurality of firmware code modules; and
    before verifying the plurality of firmware code modules, accessing a bootloader including a bootloader SPL value, and checking if the bootloader SPL value is greater than or equal to an associated bootloader check SPL value stored in the firmware security table, wherein the bootloader performs the verification of the plurality of firmware code modules.

2. The method of claim 1, further comprising:
    if the bootloader SPL value is greater than or equal to an associated bootloader check SPL value stored in the firmware security table, loading the bootloader to the security processor and executing the bootloader;
    if not, performing a recovery procedure; and
    wherein verifying the plurality of firmware code modules further comprises, for each firmware code module, (a) accessing each respective firmware module and obtaining a respective firmware SPL value, (b) accessing the firmware security table to obtain a respective one of the check SPL values, and (c) checking if the respective firmware SPL value is equal to or greater than the respective check SPL value.

3. The method of claim 2, wherein loading the bootloader to the security processor includes loading from a non-volatile memory.

4. The method of claim 1, wherein booting the security processor includes booting from a secure read only memory (ROM) integrated with the security processor.

5. The method of claim 1, further comprising:
    loading data from the firmware security table into random access memory (RAM) in the security processor; and
    accessing the loaded data when verifying the plurality of firmware code modules.

6. The method of claim 1, further comprising updating the firmware security table, and associated with updating the firmware security table, increasing the table SPL and writing a new minimum SPL value to the set of write-once memory bits.

7. The method of claim 1, further comprising, after verifying a selected one of the firmware code modules, under control of the security processor, loading the selected firmware code module to a processor and initializing the processor.

8. The method of claim 1, wherein reading the set of write-once memory bits comprises reading a set of one-time programmable fuses.

9. A data processing platform comprising:
    a non-volatile memory;
    a system on chip coupled to the non-volatile memory and comprising:
        a processor including one or more processing cores;
        a security processor including a microcontroller core, a set of write-once memory bits coupled to the microcontroller core, a random-access memory (RAM) coupled to the microcontroller core, and a secure boot read only memory (ROM) coupled to the microcontroller core;
    wherein the security processor operates to:
        boot the security processor;
        read the set of write-once memory bits to obtain a minimum security patch level (SPL);
        verify that a table SPL for a firmware security table is greater than or equal to the minimum SPL, the firmware security table including a plurality of firmware identifiers for firmware code modules, and a plurality of check SPL values each associated with respective one of the firmware identifiers;
        verify a plurality of firmware code modules; and
        before verifying the plurality of firmware code modules, access a bootloader including a bootloader SPL value, and checking if the bootloader SPL value is greater than or equal to an associated bootloader check SPL value stored in the firmware security table, wherein the bootloader performs the verification of the plurality of firmware code modules.

10. The data processing platform of claim 9, wherein the security processor further operates to:
    if the bootloader SPL value is greater than or equal to an associated bootloader check SPL value stored in the firmware security table, load the bootloader to the security processor and execute the bootloader;
    if not, perform a recovery procedure; and wherein verifying the plurality of firmware code modules further comprises, for each firmware code module, (a) accessing each respective firmware module and obtaining a respective firmware SPL value, (b) accessing the firmware security table to obtain a respective one of the check SPL values, and (c) checking if the respective firmware SPL value is equal to or greater than the respective check SPL value.

11. The data processing platform of claim 10, wherein loading the bootloader to the security processor includes loading from the non-volatile memory.

12. The data processing platform of claim 9, wherein booting the security processor includes booting from a secure ROM integrated with the security processor.

13. The data processing platform of claim 9, wherein the security processor further operates to:
load data from the firmware security table into the RAM; and
access the loaded data when verifying the plurality of firmware code modules.

14. The data processing platform of claim 9, wherein the security processor further operates to detect an update to the firmware security table, and associated with updating the firmware security table, increase the table SPL and write a new minimum SPL value to the set of write-once memory bits.

15. The data processing platform of claim 9, wherein the security processor further operates to, after verifying a selected one of the firmware code modules, load the selected firmware code module to the processor and initialize the processor.

16. The data processing platform of claim 9, wherein the set of write-once memory bits comprise a set of one-time programmable fuses.

17. A security processor comprising:
a microcontroller core;
a set of write-once memory bits coupled to the microcontroller core;
a random-access memory (RAM) coupled to the microcontroller core; and
wherein the security processor operates to:
boot the security processor;
read the set of write-once memory bits to obtain a minimum security patch level (SPL);
verify that a table SPL for a firmware security table is greater than or equal to the minimum SPL, the firmware security table including a plurality of firmware identifiers for firmware code modules, and a plurality of check SPL values each associated with respective one of the firmware identifiers;
verify a plurality of firmware code modules by, for each firmware code module, (a) accessing each respective firmware module and obtaining a respective firmware SPL value, (b) accessing the firmware security table to obtain a respective one of the check SPL values, and (c) checking if the respective firmware SPL value is equal to or greater than the respective check SPL value; and
before verifying the plurality of firmware code modules, access a bootloader including a bootloader SPL value, and checking if the bootloader SPL value is greater than or equal to an associated bootloader check SPL value stored in the firmware security table, wherein the bootloader performs the verification of the plurality of firmware code modules.

18. The security processor of claim 17, wherein the security processor further operates to:
before verifying the plurality of firmware code modules, access a bootloader including a bootloader SPL value, and checking if the bootloader SPL value is greater than or equal to an associated bootloader check SPL value stored in the firmware security table;
if the bootloader SPL value is greater than or equal to an associated bootloader check SPL value stored in the firmware security table, load the bootloader to the security processor and execute the bootloader;
if not, perform a recovery procedure; and
wherein verifying the plurality of firmware code modules further comprises, for each firmware code module, (a) accessing each respective firmware module and obtaining a respective firmware SPL value, (b) accessing the firmware security table to obtain a respective one of the check SPL values, and (c) checking if the respective firmware SPL value is equal to or greater than the respective check SPL value.

19. The security processor of claim 18, wherein loading the bootloader to the security processor includes loading from a non-volatile memory.

20. The security processor of claim 19, wherein the non-volatile memory is external to the security processor.

21. The security processor of claim 17, further comprising a secure read-only memory (ROM) integrated with the security processor and wherein booting the security processor includes booting from the secure ROM.

22. The security processor of claim 17, wherein the security processor further operates to:
load data from the firmware security table into the RAM; and
access the loaded data when verifying the plurality of firmware code modules.

23. The security processor of claim 17, wherein the security processor further operates to detect an update to the firmware security table, and associated with updating the firmware security table, increase the table SPL and write a new minimum SPL value to the set of write-once memory bits.

24. The security processor of claim 17, wherein the security processor further operates to, after verifying a selected one of the firmware code modules, load the selected firmware code module to the processor and initialize the processor.

25. The security processor of claim 17, wherein the set of write-once memory bits comprise a set of one-time programmable fuses.

* * * * *